Patented July 12, 1938

2,123,661

UNITED STATES PATENT OFFICE 2,123,661

PROCESS FOR PREPARING AMMONIUM NITRATE OF LOW WEIGHT PER UNIT OF VOLUME

Irnfried Petersen, Wolfen, and Anton Zehetmayr, Bitterfeld, Germany, assignors to I. G. Farbenindustrie Aktiengesellschaft, Frankfort-on-the-Main, Germany No Drawing. Application March 22, 1935, Serial No. 12,514. In Germany March 28, 1934

3 Claims. (Cl. 23—103)

The present invention relates to ammonium nitrate having a low weight per unit volume and to a process of preparing same.

According to the process hereinafter described ammonium nitrate having a low weight per unit volume is obtained by spraying a solution of ammonium nitrate through a nozzle or atomizer into a spraying chamber. More particularly the present invention may be carried out by spraying a concentrated solution of ammonium nitrate by means of a nozzle or atomizer into a spraying chamber while furnishing heat necessary to evaporate the concentrated solution and maintaining a vacuum or reduced pressure in the spraying chamber. The preferred way of carrying out the present invention comprises the heating of the concentrated solution, spraying said solution while maintaining a vacuum in the spraying chamber which is preferably heat insulated to avoid loss of heat. The liquor may furthermore be atomized with the injection of air, however, care should be taken to maintain a vacuum or an absolute pressure of not more than about 190 mm. mercury gauge.

The liquor used for spraying should have a concentration of about 85% to about 95% of ammonium nitrate and should preferably be heated to temperatures of about 80° to about 120° C. the temperatures being the higher the more concentrated the liquor.

The resulting crystals collect in a dry or nearly dry condition at the bottom of the spraying chamber and are removed therefrom in a customary manner.

The product obtained is a mass of extremely fine irregularly matted crystals having a low weight per unit volume of about 0.4 to about 0.6 kgs. per cubic decimetre, which do not show enclosures of mother liquor.

Example

An aqueous solution containing 91% of ammonium nitrate which has been heated to about 120° C. is atomized through a 3 mm. nozzle into a heat insulated spraying chamber with a capacity of about 5 cbm. To avoid a loss of heat the spraying chamber should be insulated by means of good insulating material such as asbestos to maintain a constant temperature of about 60 to about 70° C. in the vessel during the process. By means of a vacuum pump connected with the spraying chamber an absolute pressure of about 160 mm. mercury gauge is maintained. The product which collects at the bottom of the spraying chamber may be removed at intervals or continuously by means of a worm conveyer. The weight per unit volume of the crystalline mass obtained is below 0.5 kgs. per cubic decimetre.

We claim:

1. A process of preparing crystalline ammonium nitrate having a low weight per unit volume which comprises heating a concentrated aqueous solution of ammonium nitrate capable of crystallizing on cooling to a temperature slightly below its boiling point at atmospheric pressure and thereupon atomizing it by the injection of air while applying pressure substantially below atmospheric to said atomized solution.

2. A process of preparing crystalline ammonium nitrate having a low weight per unit volume which comprises heating a concentrated aqueous solution of ammonium nitrate of about 85–95% to a temperature slightly below its boiling point at atmospheric pressure and thereupon atomizing it in association with air while applying a pressure of not more than about 190 mm. mercury gauge to said atomized solution.

3. A process of preparing crystalline ammonium nitrate having a low weight per unit volume which comprises heating a solution of ammonium nitrate of about 85 to about 95% to a temperature of about 80 to about 120° C. and thereupon atomizing it in association with air while applying an absolute pressure of not more than about 190 mm. mercury gauge to said atomized solution.

IRNFRIED PETERSEN.
ANTON ZEHETMAYR.